United States Patent [19]
Johnston

[11] Patent Number: 4,741,421
[45] Date of Patent: * May 3, 1988

[54] VISCOUS CLUTCH FOR ENGINE COOLING FAN WITH IMPROVED FLUID FLOW PATH CONTROL AND FEED TO SHEAR ZONE

[75] Inventor: Gary L. Johnston, Pleasant Hill, Ohio

[73] Assignee: General Motors Corporation, Detroit, Mich.

[ * ] Notice: The portion of the term of this patent subsequent to Dec. 23, 2003 has been disclaimed.

[21] Appl. No.: 929,014

[22] Filed: Nov. 10, 1986

Related U.S. Application Data

[63] Continuation-in-part of Ser. No. 671,502, Nov. 15, 1984, Pat. No. 4,699,258, and a continuation-in-part of Ser. No. 657,974, Oct. 5, 1984, Pat. No. 4,630,721.

[51] Int. Cl.$^4$ .................. F16D 35/00; F16D 43/25
[52] U.S. Cl. .................. 192/58 B; 192/82 T
[58] Field of Search .................. 192/58 B, 82 T

[56] References Cited

U.S. PATENT DOCUMENTS

| | | | |
|---|---|---|---|
| 3,865,221 | 12/1974 | Coty | 192/58 B |
| 4,190,139 | 2/1980 | Tinholt et al. | 192/58 B |
| 4,235,322 | 11/1980 | Sutaruk | 192/58 B |
| 4,627,524 | 12/1986 | Hayashi et al. | 192/58 B |
| 4,630,721 | 12/1986 | Johnston et al. | 192/82 T |
| 4,699,258 | 10/1987 | Johnston et al. | 192/58 B |

FOREIGN PATENT DOCUMENTS

| | | | |
|---|---|---|---|
| 2234010 | 1/1974 | Fed. Rep. of Germany . | |
| 69327 | 5/1980 | Japan | 192/58 B |
| 86630 | 5/1982 | Japan | 192/82 T |

*Primary Examiner*—Rodney H. Bonck
*Assistant Examiner*—David A. Testardi
*Attorney, Agent, or Firm*—Charles R. White

[57] ABSTRACT

A viscous fan clutch having clutch and pump plates with interleaved lands to form the shear zone featuring an annular blocker ring and axial fluid feed passages radially inward of the blocker ring leading to the shear zone through lands partially or completely removed from the clutch plate to improve flow distribution into the shear zone.

6 Claims, 2 Drawing Sheets

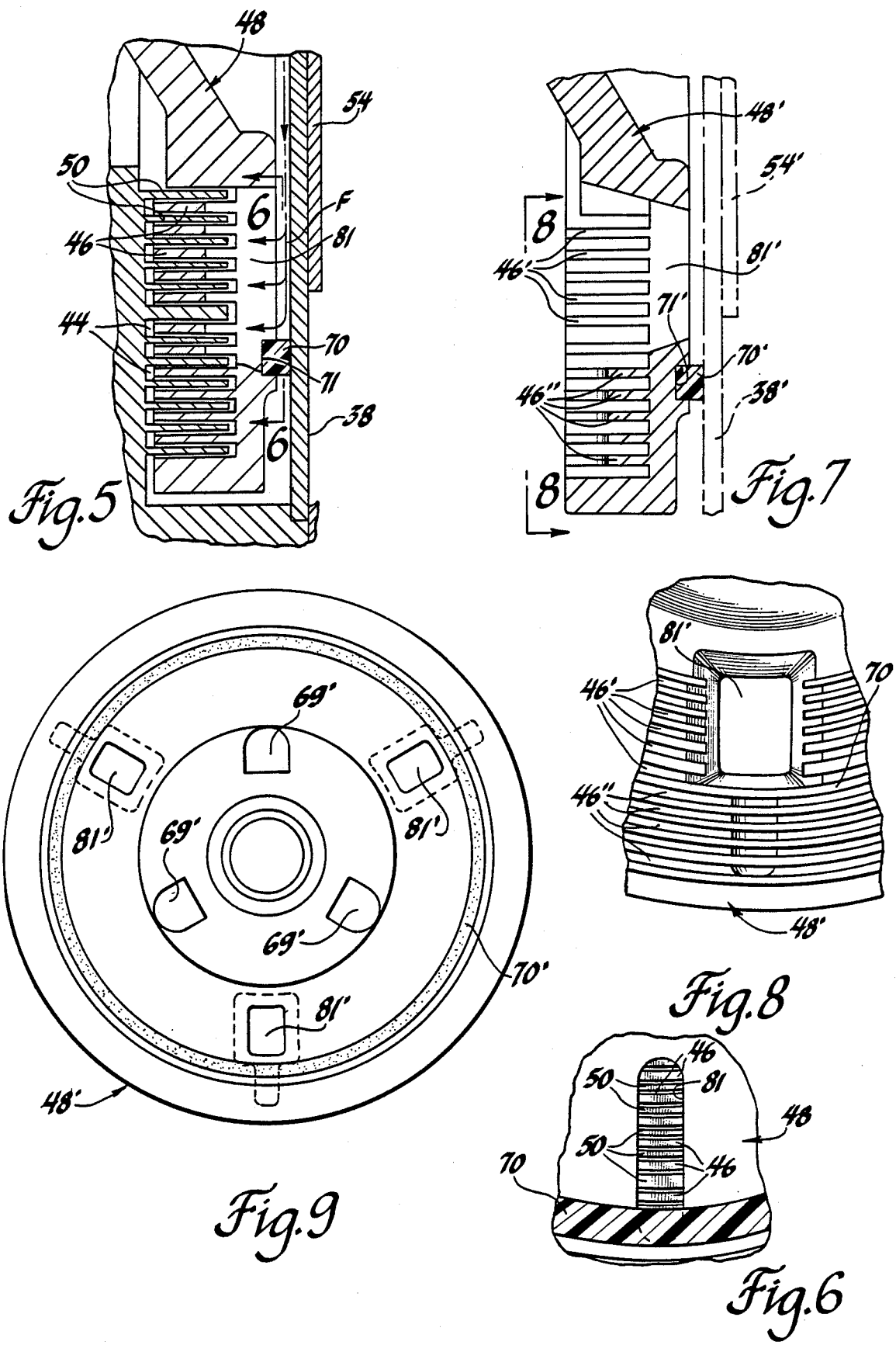

VISCOUS CLUTCH FOR ENGINE COOLING FAN WITH IMPROVED FLUID FLOW PATH CONTROL AND FEED TO SHEAR ZONE

This invention is a continuation-in-part of applications Ser. No. 671,502, filed Nov. 15, 1984 now U.S. Pat. No. 4,699,258 and Ser. No. 657,974, filed Oct. 5, 1984, now U.S. Pat. No. 4,630,721.

BACKGROUND OF THE INVENTION

This invention relates to fan clutches and more particularly to a temperature responsive automatic viscous clutch for an engine cooling fan featuring new and improved axial feed of fluid to the shear zone with optimized control of fluid routing.

FIELD OF THE INVENTION

An automatic viscous fan clutch is a hydraulic device shearing silicone fluid for varying fan speed in response to engine temperature variation. This device provides a temperature responsive drive into a high delivery fan to insure adequate cooling at reduced engine speeds. The drive is substantially disconnected at predetermined lower temperature to eliminate excessive fan noise and power loss at high speeds when there is no requirement for fan drive cooling. Generally when the engine is cool, the viscous silicone clutching fluid is stored in a reservoir chamber of the fan clutch and is blocked from entry into the working area or fluid shear zone of the clutch. As the temperature of the engine rises, so does the temperature of a bimetallic coil which is connected to a control arm that moves a valve plate progressively exposing an opening in the pump plate. The silicone fluid flows through this opening from the reservoir into the working area in the clutch. Raised pumping devices located on the pump plate force the fluid back into the reservoir through small openings in front of each of the pumping devices. As the temperature continues to rise, the control arm uncovers more of the opening and allows more of the silicone fluid to enter the working chamber. The automatic fan clutch becomes fully engaged when the silicone fluid circulating between the working chamber and the reservoir reaches a sufficient level in the working chamber to completely fill the fluid shear zone formed between the clutch body and the clutch plate. The resistance of the silicone fluid to the shearing action caused by the speed differential between the body and clutch plate transmits torque to the clutch body to thereby turn the fan blade assembly attached thereto. The reverse situation occurs when the temperature drops below a predetermined temperature. As this lower temperature is reached, the bimetallic controlled valve plate slowly closes off the opening to block the fluid flow from the reservoir into the working chamber. The action of the pumping devices remove the silicone fluid from the shear zone or the working chamber so that shearing action is terminated or sharply reduced. Thus as less torque is transmitted to the clutch body the speed of the fan decreases to its minimum speed.

SUMMARY OF THE INVENTION

This invention applies to a viscous fan clutch such as described above and further provides improved fluid feed to the shear zone and the control of the flow path in the clutch. This invention further improves fluid fill and clutch drive time. This invention particularly improves pump-out performance of the clutch to reduce and optimize disengagement time and to reduce the temperature differential between the engagement and disengagement temperature.

The preferred embodiment of this invention employs axial flow feed slots in the face of the clutch plate that extend deeply into or completely through the fluid shearing lands therein to provide improved flow of the viscous fluid into the shear zone of the clutch. These feed slots are preferably adjacent to and radially inwardly of a sealing ring operatively disposed between the face of the clutch plate and pump plate. This sealing ring positively diverts flow into the axial flow feed slots into the shear zone so that all flow is subjected to shear by the interleaved lands to provide improved effectiveness. Accordingly, with this invention, fluid does not bypass the shear zone, as in many applications, for immediate pumping back to the reservoir without being sheared. Pump slots or grooves may be provided on the inside diameter of the body and at the outside diameter of the clutch plate. This invention may utilizes flat parallelogram-shaped wipers secured in pump pockets in the annular wall of the pump body and in sliding contact with the annular outer periphery of the clutch plate. These wipers in conjunction with associated pump slots provide for optimized scavaging and pumping of viscous fluid through the pump slots into a annular intermediate cavity between the forward face of the clutch plate and the rearward face of the pump plate whose internal diameter is defined by the sealing ring operatively mounted between these two components. From this intermediate cavity, the fluid is quickly pumped by the pumping devices embossed on the rotating pump plate through a discharge port therein to the reservoir. The pumping slots and wipers have leading edges formed with any desired pumping angle to control the rate of discharge from the shear zone or working cavity to the intermediate cavity and thus to the reservoir. In this invention the pumping slots, when used in conjunction with the wipers, will further increase the effectiveness and consistency of the viscous clutch. The number of pump slots and the angularity of the forward face of the wiper may be varied to increase or decrease the rate of discharge of fluid from the working chamber. The wiper material may be selected to suit operating requirements and may be low temperature plastic or high temperature Teflon depending on the operating environment. A primary advantage of this invention is to materially improve pumping efficiency while reducing operating horsepower, reduce fan noise and provide faster clutch disengagement.

These and other features, objects and advantages of this invention will become more apparent from the following detailed description and drawing in which:

BRIEF DESCRIPTION OF THE DRAWING

FIG. 5 is an enlarged view of a portion of the clutch plate of FIG. 1 to illustrate an axial flow feed slot in the clutch plate and the cooperating blocker ring.

FIG. 6 is a fragmental view of the clutch plate as viewed along lines 6—6 of FIG. 5.

FIG. 7 is an enlarged view similar to that of FIG. 5 illustrating a second embodiment of this invention with axial feed slots completely through the concentric lands in the clutch plate.

FIG. 8 is a rear elevational view of a portion of the clutch plate of the second embodiment of the invention.

FIG. 9 is a front elevational view of the clutch plate of the second embodiment of the invention.

Figure 1:
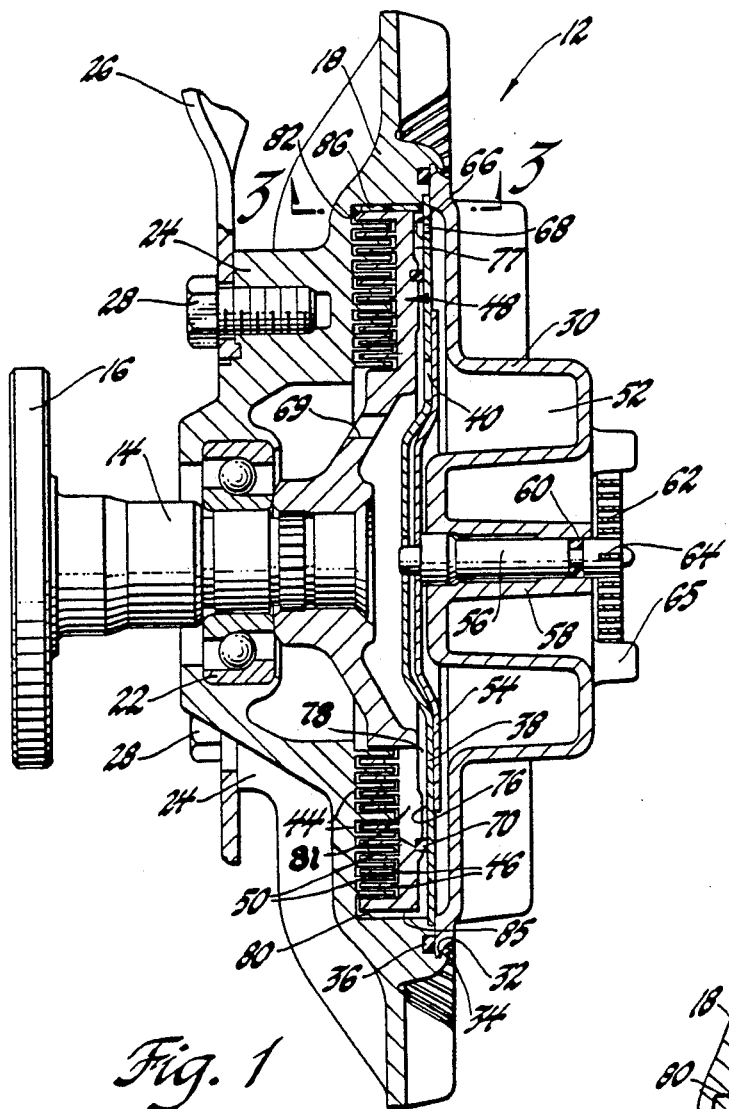
FIG. 1 is a cross-sectional view of a portion of a fluid shear-type clutch and fan assembly.

Turning now in greater detail to the drawing, there is shown in FIG. 1 a multi-bladed fan and clutch assembly 12 for drawing cooling air through the core of a vehicle radiator, not shown, through which engine cooling fluid is circulated. The fan and clutch assembly 12 is mounted on the outboard end of a rotatably driven shaft 14 whose inner end terminates in a flange 16 which can be secured to a conventional engine-driven water pump pulley, not shown. The fan and clutch assembly 12 comprises an annular dish-like main clutch body 18 centrally mounted for rotation on shaft 14 by bearing 22. The main body 18 is formed with a plurality of radially extending bosses 24 to which a multi-bladed fan 26 is attached by threaded fasteners 28. A cover plate 30 is mounted to the front of the main body 18 and cooperates therewith to form a housing for the viscous clutch and reservoir of this invention.

The cover plate 30 is a dished member whose annular outer edge 32 is secured to the main body by annular retainer lip 34 spun over from the material of the main body. Annular seal 36 interposed between the edge 32 and the forward face of the main body prevents fluid leakage of the silicone viscous clutching fluid from the interior of the clutch.

Disposed immediately behind cover plate 30 is a disk-like annular pump plate 38 whose diameter is slightly less than that of the cover plate 30. This pump plate is drivingly secured to the main body 18 since it is trapped on an annular shoulder on the main body by the cover plate 30.

The pump plate has an opening or gate 40 therein which, when opened, allows silicone clutching fluid to flow into an annular serpentined fluid shear zone 44 formed by the space between the interleaved concentric annular ridges or lands 46 formed in the rear face of a clutch plate 48 and corresponding concentric annular ridges or lands 50 formed on the interior surface of the main body 18. The controlling of the path of flow is an important part of this invention and will further be explained below. The fluid sheared in this shear zone 44 transmits input torque from the rotatably driven clutch plate 48, centrally splined to shaft 14, to provide for the hydraulic drive of main body 18 and the bladed fan 26 attached thereto for cooling fan operation. Because of slippage in the drive, fan speed is less than input speed when the input is driving the fan. A reservoir 52 formed between the cover plate 30 and the pump plate 38 contains a specified quantity of silicone clutching fluid that circulates in a toroidal path when the gate 40 is open to varying degrees of opening as described. The opening and closing of the gate 40 to control of the supply of the clutch silicone fluid into the shear zone is through a valve plate 54 that extends from driving connection with a center shaft 56 which is rotatably mounted in a tubular hub portion 58 formed in the center of the cover plate 30. An O-ring seal 60 is mounted in an annular groove in the shaft 56 and makes peripheral contact with the inner wall of the hub to prevent fluid leakage to the exterior of the unit. A helically wound bimetallic thermostatic valve control element 62 is provided with an inner end portion 64 which is mounted in a transverse slot formed in the forward end of the center shaft 56. The outer end of the valve control element 62 is secured to a post 65 projecting from the cover. With this arrangement, an increase or decrease in ambient temperature causes the winding or unwinding of the metallic element resulting in rotation of the center shaft 56 and the valve plate 54 attached thereto.

A cylindrical projecting pump element 66 pressed in the pump plate 38 adjacent to the periphery thereof pumps fluid through a discharge orifice 68 formed in the pump plate back into the reservoir as is well known in this art.

In one preferred embodiment, there is a fan clutch divider ring 70 operatively interposed between the pump plate and the clutch plate. This ring is a filled Teflon ring member which is operatively mounted in an annular groove 60 formed in the outer or front face of the clutch plate. The ring 70 is of a square cross-section and the outer surface of this ring slidably and sealingly engages the walls of groove 71 as well as the inner surface 76 of the pump plate 38 to form a ringlike outer pumping cavity 77 for return pumping of the fluid to the reservoir and to block the full radial passage of fluid from the reservoir past the forward face of the pump plate into the pumping cavity 77. Accordingly, the viscous clutching fluid flows directly from gate 40 in the pump plate 38 and then radially outwardly in space 78 between the pump plate and clutch plate and subsequently through axial shaped and radially spaced passages 81 formed in the clutch plate. These are axial flow passages located immediately radially inward of the ring 70 and lead to the viscous shear zone 44. These axial flow passages extend substantially into lands 46 and about ⅓ of the height of the lands. The axial flow is shown in FIG. 5 so that fluid from the reservoir is rapidly fed into the shear zone. In the absence of the dynamic fluid seal and blocker ring 70, much of the viscous fluid leaving the reservoir through gate 40 would flow directly outwardly between the forward face of the clutch plate 48 and the adjacent face of the pump plate into the intermediate cavity 77 and to discharge port 68 thereby bypassing the fluid shear zone 44. This would reduce efficiency and effectiveness of the viscous clutch.

The ring 70 can be increased or reduced in width to provide tailoring of the size of opening 81 to control the quantity of flow into the shear zone. For example, the ring could be doubled in width to reduce the opening 81 to decrease the axial flow into the shear zone to increase the time to fill the shear zone to suit particular requirements. The annular divider ring by itself as pointed out in U.S. Pat. No. 4,630,721 assigned to the assignee of this invention herein incorporated by reference improves pump-out performance or clutch disengagement time since the area between the pump plate and clutch plate is blocked and the possibility of oil recirculation downwardly in front of the clutch plate is eliminated when the gate is closed. The divider ring in the present invention generally forces the viscous fluid to flow through the axial flow passages 81 and when chamber 78 is supplied with oil, passage 69 is available for substantial axial oil feed.

The axial flow through passages 81 is deeply and directly into the sinuous shear zone 44 as defined by the interleaved lands 46, 50. With the full and rapid axial flow into the shear zone because of the blocker ring and the adjacent axial feed passages 81, engagement time is substantially improved over prior devices. As the fluid courses through the interleaved lands for pumping cavity 77 the fluid is sheared to the viscous drive of the body 18 and the fan attached thereto. With the speed differential existing between the pump and clutch plates, there is high efficiency and high volume pumping back to the reservoir.

FIGS. 7, 8 and 9 illustrate the second embodiment of the invention which differs from the first embodiment in the modification of the clutch plate. In this second embodiment, the clutch plate components corresponding to those of the first embodiment are identified by corresponding numerals which are primed. In the second modification, the axial face passages 81' are equally arcuately spaced and extend completely through lands 46' in the clutch plate 48'. The outer five ring or lands 46" have their inner ends removed as shown in FIGS. 7, 8 and 9 to provide internal radial grooving for improved radial flow distribution. With the full flow axial openings, there is improved fill of the shear space with no partial blockage provided by the clutch plate lands as in the first embodiment. The clutch blocker ring 70 is radially outwardly of the opening 81' and provides improved blocker ring support and durability.

With ring 70 or 70' providing an outboard bearing, the clutch plate cannot frictionally contact the inside of the cover plate. This reduces heat buildup and wear and thereby extends service life.

Figure 3:
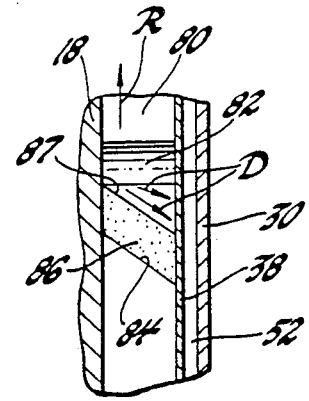
FIG. 3 is a sectional view taken along lines 3—3 of FIG. 1 to illustrate pumping action of the viscous fluid wiper employed in this invention.
Figure 2:
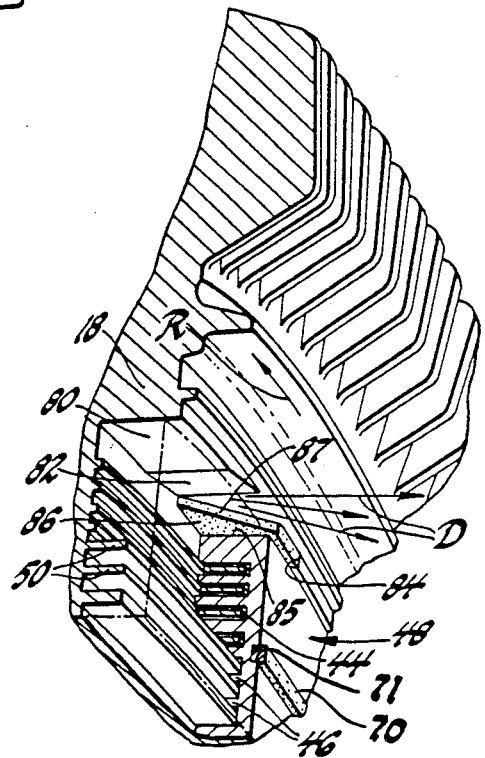
FIG. 2 is an enlarged isometric view of a portion of the fan clutch assembly of FIG. 1.

In both embodiments of this clutch, the inner circumferential wall 80 of the main body 18 may be formed with a plurality of wedge-shaped pumping slots or grooves 82 best shown in FIGS. 2 and 3. At the rear end of these slots, the wall 80 is formed with recesses 84 which carry flat rectilinear wipers 86 shown in FIGS. 2 and 3. These wipers are made from a suitable plastics which may vary from low temperature plastics to high temperature Teflon depending on the operating environment. These wipers slidably contact the annular periphery 85 of the clutch plate and have forward faces 87 that may be of any desired angle to optimize pumping from the shear zone to the intermediate cavity 77. The contact of the wipers at selected arcuate positions with the periphery of the clutch plate provides improved radial support and dynamic stability of this viscous clutch.

Figure 4:
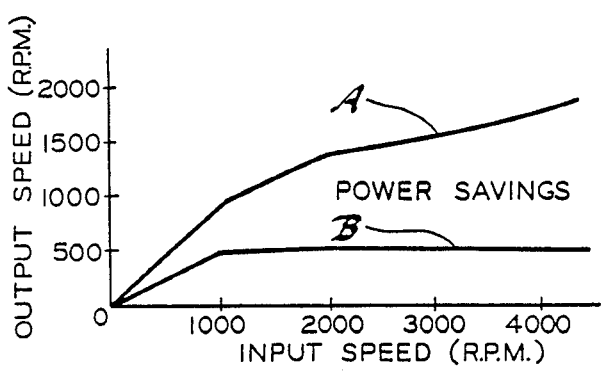
FIG. 4 is an illustrative graph of power savings provided by this invention.

In the pump-out operation with the valve plate 54 moving to the closed position to block gate 40, the chamber 73 is quickly extended. The wipers rotating in a counterclockwise direction, arrow R, relative to the clutch plate slidably contact and scavenge viscous fluid from the outer diameter of the clutch plate and vigorously pump the viscous fluid from the annular space between the main body wall 80 and the outer diameter of the clutch plate as illustrated by discharge arrows D. With this construction, the viscous fluid is quickly and actively pumped from the shear zone into annular intermediate chamber 77 outboard of the blocker ring. From this chamber, the fluid is quickly pumped by the conventional pump element 66 into reservoir 52. The pumping grooves are also effective in the absence of the wipers since they are capable of pumping fluid with reduced effectiveness. into the cavity 77. A standard clutch and a similar clutch with the wipers and pump-out slots is shown in the curves of FIG. 4. Curve A represents operation of the standard clutch. As the input speed drops off toward zero, output or fan speed gradually diminishes to zero. With the standard clutch using the pump-out slots and wipers, curve B, output speed is flat and lower with comparative input speeds because of the efficiency of the pump-out slots and wipers. At 1000 rpm input, the valve plate 54 has completely closed the gate 40 and the output speed rapidly diminishes to zero as shown by curve B. The area between the two curves represents the savings in operating horsepower. Furthermore, since pump-out is faster, the effective viscous drive disengagement is faster which result is reduced fan noise. With the improved routing of this invention by the ring seal and axial flow feed slots, there is an even greater economy in operating horsepower.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A bladed fan and hydraulic clutch assembly for inducing a flow of cooling air through a radiator in which engine coolant is circulated comprising an input shaft member adapted to be rotatably driven, annular clutch plate means rotatably driven by said shaft member, said clutch plate means having front and rear faces, said rear face having a plurality of axially extending and concentric lands, rotatable clutch body means axially spaced from said clutch plate means having a plurality of axially extending and concentric lands interleaved with said lands of said clutch plate means to form a fluid shear zone therebetween, a pump plate fixed to said clutch body means and encasing said clutch plate in said clutch body means, said pump plate cooperating with said body to define reservoir means for containing a quantity of viscous shear fluid for operating said clutch assembly, an outlet opening in said pump plate for said reservoir, control means for opening and closing said outlet opening, axially extending openings formed in said clutch plate connected to said shear zone and extending through the front face of said clutch plate and at least to the concentric lands in the rear face thereof, said openings having an outer limit disposed radially inwardly of the periphery of said clutch plate means, annular fluid seal ring means adjacent to the outer limits of said axially extending openings and operatively interposed between said pump plate and said clutch plate for diverting said fluid supplied from said reservoir axially through said axially extending openings and directly into said shear zone so that said clutch body means is rotatably driven by said clutch plate means through the shear of fluid in said shear zone, fan blade means extending from said clutch body means, said pump plate having pumping means associated therewith to pump fluid exiting from said shear zone back into said reservoir means.

2. The assembly defined in claim 1 wherein said axially extending openings extend partially into said lands of said clutch plate.

3. The assembly defined in claim 1 wherein said axially extending openings extend completely through said lands of said clutch plate.

4. A bladed fan and hydraulic clutch assembly for inducing a flow of cooling air through a radiator in which engine coolant is circulated comprising an input shaft member adapted to be rotatably driven, clutch plate means rotatably driven by said shaft member, said clutch plate means having a plurality of axially extending and concentric lands forming grooves therebetween, axial flow opening means through at least a portion of said clutch plate means communicating with said lands and said grooves, said axial flow opening means having an outer limit disposed inwardly of the periphery of said clutch plate means, clutch body means axially spaced from said clutch plate means having a plurality of axially extending and concentric lands interleaved with the lands of said clutch plate means to form a fluid shear zone therebetween, a pump plate secured to said clutch body means and encapsulating said clutch plate means, a cover plate fixed to said clutch body means, a reservoir for viscous shear fluid for said clutch assembly, a fluid for said clutch assembly, a fluid supply passage in said pump plate, control means for opening and closing said supply passage, annular seal ring means operatively interposed between said pump plate and said clutch plate and adjacent to the outer radial limit of said axial flow opening means for diverting said clutch fluid through said axial flow opening means into said shear zone so that said clutch body means can be rotatably driven by said clutch plate means through the shear of fluid therein, fan blade means extending from said clutch body means, and pumping means outboard of said seal ring means for pumping clutch fluid from the shear zone into said reservoir.

5. The assembly of claim 4 wherein said seal ring means blocks at least a portion of said axial flow opening means to control the amount of fluid flowing axially into said shear zone while blocking radial flow toward said pumping means.

6. The assembly of claim 4 wherein said seal ring means is carried by said clutch plate means and slidably and sealingly engages said pump plate means.

* * * * *